United States Patent
Celi et al.

(10) Patent No.: US 11,478,866 B2
(45) Date of Patent: Oct. 25, 2022

(54) MACHINE TOOL FOR PROCESSING SAW DISKS

(71) Applicant: PARTEC S.R.L., Piacenza (IT)

(72) Inventors: Fosco Celi, Rimini (IT); Stefano Mazza, Carminano (IT)

(*) Notice: Subject to any disclaimer, the term of this patent is extended or adjusted under 35 U.S.C. 154(b) by 0 days.

(21) Appl. No.: 17/266,130

(22) PCT Filed: Aug. 4, 2019

(86) PCT No.: PCT/IB2019/056631
§ 371 (c)(1),
(2) Date: Feb. 5, 2021

(87) PCT Pub. No.: WO2020/031051
PCT Pub. Date: Feb. 13, 2020

(65) Prior Publication Data
US 2021/0252619 A1    Aug. 19, 2021

(30) Foreign Application Priority Data

Aug. 10, 2018 (IT) .......................... 102018000008070

(51) Int. Cl.
*B23D 63/18* (2006.01)
*B23D 65/00* (2006.01)
B23D 63/14 (2006.01)
B23D 63/00 (2006.01)

(52) U.S. Cl.
CPC ............. *B23D 63/18* (2013.01); *B23D 65/00* (2013.01); *B23D 63/008* (2013.01)

(58) Field of Classification Search
CPC ...... B23D 63/18; B23D 63/008; B23D 63/14; B23D 65/00; B23D 65/02

USPC ............... 76/26, 27, 112; 33/202; 72/76; 173/90–140, 200–212

See application file for complete search history.

(56) References Cited

U.S. PATENT DOCUMENTS

| 3,964,348 | A | * | 6/1976 | Dawson | B23D 63/18 76/26 |
| 4,138,908 | A | * | 2/1979 | Kampmann | B23D 63/18 72/421 |
| 5,522,283 | A | * | 6/1996 | Brown | B23D 63/18 76/25.1 |

(Continued)

FOREIGN PATENT DOCUMENTS

| WO | 0194066 A1 | 12/2001 |
| WO | 2007063527 A2 | 6/2007 |

*Primary Examiner* — Laura M Lee
(74) *Attorney, Agent, or Firm* — Rumit Ranjit Kanakia

(57) ABSTRACT

A machine tools for processing of a saw disk includes a processor; a spindle unit having a shank provided with a flange to mount the saw disk to be rotated for processing for planarity thereof; sensor assembly having a sensor to be slide from the periphery of said saw disk to the centre thereof, wherein said sensor detects areas of discrepancy in planarity in each part of a disk face of said saw disk and communicating said data to said processor; and a hammer assembly connected to a transverse carriage assembly, the hammer assembly having: a beating head, and a preloading spring with a preload piston coupled to the beating head, wherein the preload piston is configured to load the preloading spring to transfer elastic energy to the beating head for giving, said beating head, the thrust for striking the areas of discrepancy of the saw disk.

8 Claims, 6 Drawing Sheets

(56) References Cited

U.S. PATENT DOCUMENTS

| | | | | |
|---|---|---|---|---|
| 6,067,879 A | * | 5/2000 | Rautio | B23D 63/18 |
| | | | | 76/25.1 |
| 6,305,258 B1 | * | 10/2001 | Henderson | B26D 5/00 |
| | | | | 83/13 |
| 2016/0158819 A1 | * | 6/2016 | Johnson | B25D 9/16 |
| | | | | 173/128 |

* cited by examiner

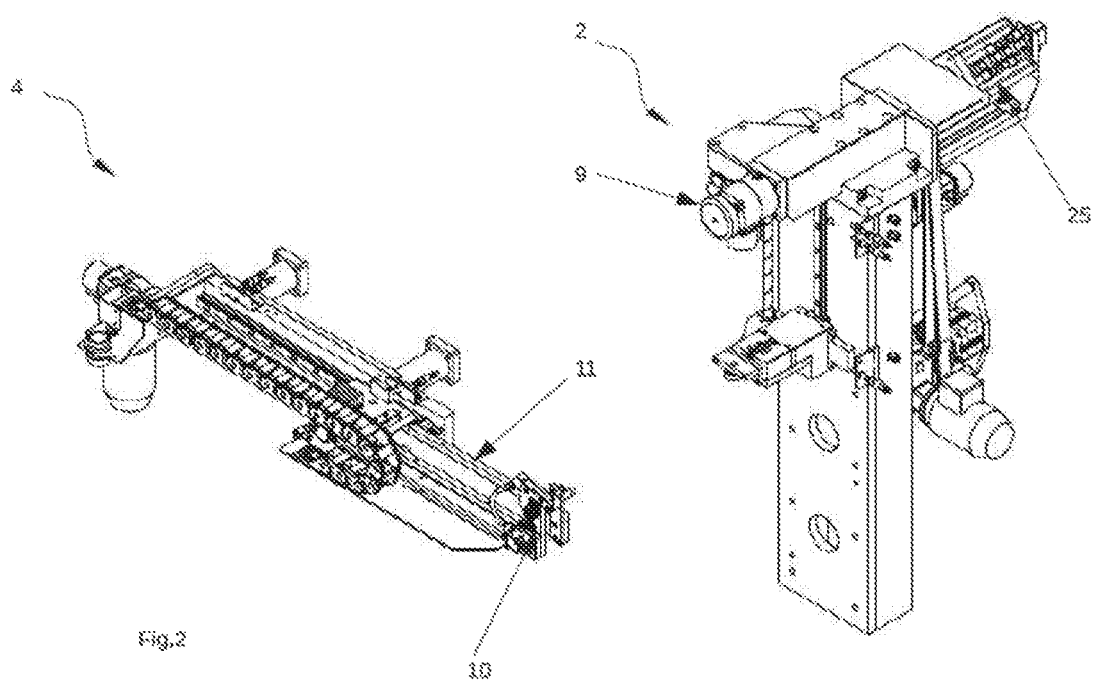

MACHINE TOOL FOR PROCESSING SAW DISKS

FIELD OF THE INVENTION

This invention relates to the machine tool field, which today is very widespread in all mechanical workshops, often being designed and built to carry out very specific tasks.

In particular, the present invention is applied for processing disks for circular saws or saw-disks. To date, the operations required to produce disks for circular saws or saw-disks can be automated in most of the various stages of processing, however, it has not still been possible to completely delegate each step of the manufacturing process to the various types of machines (including dedicated machines). In particular, there are processing phases that are still carried out by hand by dedicated operators. The present invention intends to describe a device suitable for all the processes necessary for the realization of such disks.

BRIEF DESCRIPTION OF THE PRIOR ART

More specifically, a very important aspect of the production of saw-disks or of circular saw-disks (which we will be called herebelow also simply disks), concerns the realization of the correct planarity between the two faces of the disk itself. To date, this processing is done entirely by hand.

In essence, the two faces of the disk must necessarily comply with the tolerances of planarity with reference to a plane identified by the flange that clamps on the spindle to ensure proper operation of the disks themselves.

The processing to which a circular saw disk or a saw-disk is subjected, starting from the basic semi-finished product up to the final result, subject the material of which the disk is composed to both mechanical and thermal stresses (cold/hot passages and vice versa), such stresses often have often as an undesired effect the loss of planarity between the two faces of the disk. The requirement of planarity is decidedly relevant in the field and to obtain it such processing is carried out entirely by hand by specialized operators.

This requirement is essentially linked to the need to keep within certain limits of acceptability the unbalance of the rotor (namely the unbalance of the rotating mass of the disk): in fact, this requirement is of fundamental importance for at least two specific reasons, in the first instance, a mass that is unbalanced with respect to its axis of rotation, in the rotation phase, necessarily generates vibrations that can be harmful both for the machine itself and for the rotating disk but also, potentially, for the operator who has to work in the proximity of that disk. Secondly, planarity is essential to allow precise cuts when working with the disk.

To date, in order to evaluate and to maintain planarity between the two faces of the disk within the tolerances required by the manufacturer, as mentioned above, operations that are still substantially entirely manual are used: for which, once the raw phase of the disk processing is completed, the planarity of the two faces is evaluated using, for example, a light source. A metallic ruler is placed on a first face of the disk, and light is emitted in the direction of the contact plane between the metal ruler and the surface to be examined: the roughnesses on the surface are highlighted by the passage of light from the opposite side of the metal ruler. Where more light passes there is more deformation; the peaks of discrepancies identified, are hit manually with the hammer against an anvil, this operation is based disadvantageously only on the sensitivity that the operator has acquired through experience.

This operation is therefore disadvantageously carried out manually by an operator who will also have to be an expert in dosing the blows both from the point of view of precision and from the point of view of the force with which to hit each blow. So this phase of processing, in addition to being completely operator-dependent, is also extremely slow, with consequent definitely not negligible processing costs.

In addition, it should be noted that, in recent years, the disks, to meet market demands, have doubled in weight and size making their handling not only even more difficult, but also and above all, more dangerous, with obvious disadvantages for the operators and for the correct success of the processing.

This invention aims to describe a specialized machine tool that can solve all the problems of the prior art exposed above.

It is the purpose of the present invention to describe a device that allows to carry out in a precise way the above mentioned processing.

Furthermore, it is a purpose of the present invention to describe a device that allows such operations to be carried out automatically, namely without the intervention of an operator.

It is still a purpose of the present invention to describe a machine that is suitable for the processing of any type of disks on the market.

A further purpose of the present invention is to describe a device that allows to carry out all the said operations in a safe and industrially repeatable way.

One more purpose of this invention is to describe a device that allows such processing to be carried out quickly and economically.

Finally, it is a purpose of the present invention to describe a device that allows each processing operation to be carried out while maintaining the limits of the tolerances given in a company's implementation standards.

BRIEF DESCRIPTION OF THE INVENTION

These and other aims will be obtained by means of the innovative machine tool device for processing saw disks, said machine comprising at least one spindle unit, with at least one shank 16 fitted with a flange, connected to said spindle 2 on which a saw disk to be planarized is mounted, said device being characterized by the fact that it comprises a sensor assembly 4 comprising at least one carriage 11 for handling at least one sensor 10 for measuring planarity differences on at least one face of the saw disk on each part of that face, the planarity differences being detectable substantially indistinctly on either face.

It is to be noted that, in one or more embodiment variants, there may be at least two sensors, one for measurement on each face of the disk, or the disk can be rotated for measurement on the other face, or the sensor can be rotated, or moved to the other face of the disk, for greater accuracy.

In an advantageous basic form of realization, only one sensor for measurement on one face of the disk, as it is known to industry experts that normally a discrepancy in terms of a depression or a hump on one face corresponds to identical and opposite hump and/or depression on the other face in the corresponding position.

The innovative machine tool described herein is dedicated to the production of saw-disks usually used for cutting wood, especially those suitable for cutting panel wood.

In more detail, a planarizing saw-disk is mounted on a spindle of said machine by means, for example, of a shank with a flange, connected to said spindle, the disk is mounted on the spindle and then rotated by the spindle; a capacitive planarity sensor is made to slide by means of a carriage, from the periphery of the disk to its innermost part (near the spindle coupling). Such sensor is used to detect the differences in each part of the two faces of the disk, for example by detecting the distance of the surface of the disk from a reference plane determined by the plane of the clamping flange (by virtue of the rotation of the disk and of the translatory movement of the sensor in the radial direction, a total coverage and scanning of the faces to be analyzed is achieved). The areas that will present differences lower than a certain predetermined threshold (also in relation to the type of disk and its size) can be considered within the tolerance ranges, while the differences exceeding that predetermined threshold will be those to be hit by the hammer, in order to bring these differences within tolerance.

Basically a sensor detects and measures the differences in planarity present on the surfaces of the two faces of the disk, a hammer hits the area affected by the differences identified by the sensor, the sensor returns to check and, if the planarity is within the limits, the disk is unloaded (otherwise the operation can be repeated until the result is obtained).

A hammer assembly with a beating head including at least one preload spring to give a beating head the correct thrust to strike the areas of detected discrepancy. The force with which to operate the hammer on these areas will be determined by a computer based on a database. In fact, innovatively combining each case processed and analyzed by the sensor to the number and force of the hammer blows with which the correction and re-entry into tolerance of the two surfaces of the disk has been obtained, a database can be built from which it will be possible to obtain for each disk examined by the sensor a processing program of the hammer that, advantageously, can be used as a reference in similar future cases.

In this way, said database will be structured, which will essentially allow the machine to work autonomously in an even more precise way by virtue of said database and "self-learning" capacity.

In particular, it is possible to define un a method for processing saw disks by using the device 1 in which said a computer (6)

retains the data collected by the said sensor (10);
controls the thrust for the work carried out;
detects the data by means of said sensors (10) after the operations carried out;
conserves and processes correction parameters for future operations with substantially identical data to speed up operations;

said computer being adapted to perform self-learning.

Said method for using said machine comprises as a minimum at least the phase of:

detection by the sensor (10) of data concerning the disk surface (5);
data processing;
in case of discrepancy:
processing by computer (6) of the correction to be made;
carrying out the correction by command to the beating head;
verification by sensor (10) of the result obtained;
if the correction is within the tolerance range end of processing, disk discharge;
if the correction is not within the data tolerance range;
detection of discrepancies by the sensor (10);
repetition of operations up to the result obtained end of processing, disk discharge.

In this case, the hammer, in a preferential form of construction consists of a hammer that is pushed against the target by a spring compressed by a pneumatic cylinder controlled by the computer, (namely the point on the face of the disk where the planar deformity was detected) discharging its kinetic energy against the protruding deformity from the ideal reference plane, this plane being the one identified by the flange of the spindle on which the disk is locked.

In relation to the dimensions and weights of the disks, if they had dimensions difficult to maneuver, since they are lifted by operators, they can be loaded and unloaded on and off the machine by means of a specially created system for loading and unloading the piece.

BRIEF DESCRIPTION OF THE FIGURES

These and other advantages will be obtained by virtue of the innovative machine tool for the processing of saw disks described in this invention as better explained below with reference to the description of the figures representing some embodiment forms of the present invention, in which:

in FIG. 2 it is represented a preferred embodiment form of a particular of the sensor assembly of said machine tool;

in FIG. 3 it is represented a preferred embodiment form of a part of the spindle assembly;

DETAILED DESCRIPTION OF THE FIGURES

Figure 1:
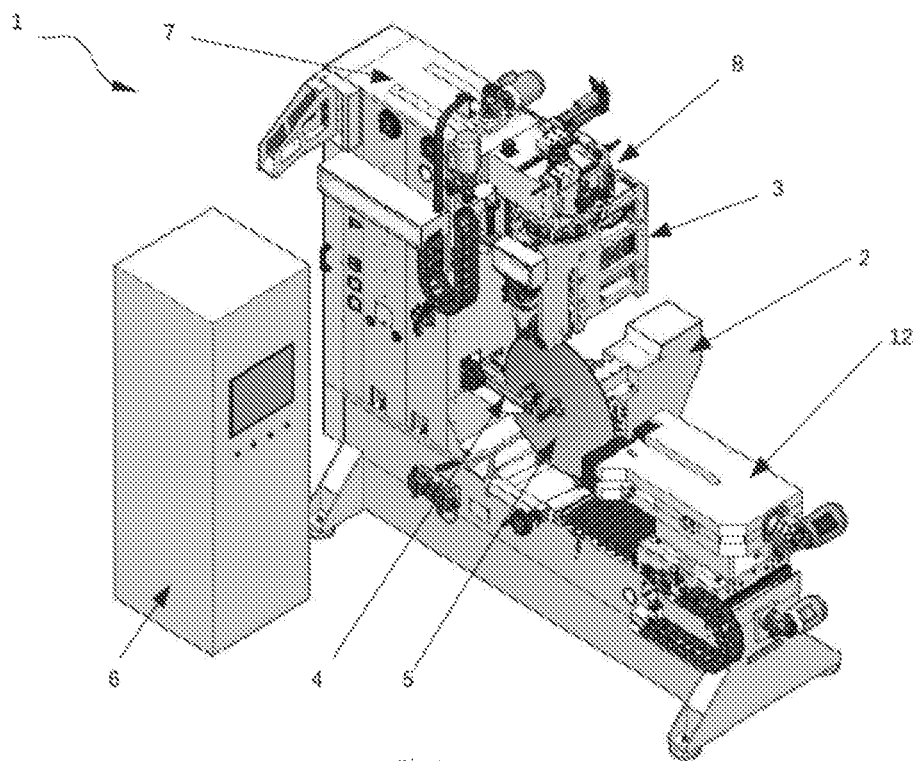
in FIG. 1 it is represented a preferred embodiment form of the innovative machine tool.

In FIG. 1 it is represented a preferred form of realization of the innovative machine tool 1 for the planarization of toothed disks and saw disks 5.

In this particular representation, a workpiece/disk 5 is already mounted on the machine tool 1. Said workpiece 5 or disk, is mounted on a spindle unit 2 by means of a quick coupling by means of a shank 16 which will be described in more detail in the following figures.

It should be noted that only the parts that are functionally useful to describe the innovative features of the present invention will be described in detail below, being intended that the skilled person has full knowledge of the functioning of generic machine tools already known on the market. In particular, a tensioning unit 12, in this case for example provided with rollers, will be used to compact the steel of the disk giving it a structural rib that will make it more stable through a compression applied between the two faces of the disk to be machined.

Also included are: at least one hammer assembly 3, one sensor assembly 4, one computer and regulator assembly 6, one vertical carriage assembly 7, and one additional transverse carriage assembly 8.

After the first pretensioning phase, once spindle 2 is started, disk 5 begins to rotate by means of spindle 2, the disk having an axis of rotation coinciding with that of said spindle. Sensor assembly 4 can perform a translatory movement in the direction of the spindle rotation axis and allows a capacitive sensor (visible in FIG. 2) mounted, for example, at an end of sensor assembly 4, to move from the periphery of disk 5, namely the external circumference of the disk, to the part closest to the attachment shank 16, namely to the centre of the disk being machined 5.

The composition of degrees of freedom, namely the rotation of disk 5 and the movement of the sensor with translatory movement along the surface of disk 5, will make it possible to analyze the entire surface of the disk itself: the capacitive sensor will detect point by point (with a resolution that can be defined a priori by the computer and regulator 6) data regarding the areas out of tolerance of planarity, in particular regarding the surface of the area out of tolerance and the thickness or degree of relief with respect to the plane (if such roughnesses exist). The spatial coordinates of these areas are identified, for example, by measuring at least two coordinates, such as for example, an angular coordinate of the spindle axis and a straight coordinate relative to the displacement of the sensor according to a straight coordinate relative to the displacement of the carriage on which the sensor 10 is mounted, these coordinates form a part of the data.

The data sent in the first place are: those collected by the sensor in relation to the position of the deformation and its degree of relevance will be transmitted continuously to a computer and regulator 6 able to record not only the deformations before processing but also the changes that occurred after the "hammering" carried out in order to recover the tolerance: so there will be data sent to the computer 6 also whenever it is performed a "correction" operation on the disk, to control the result.

The computer 6 will then command the hammer assembly 3, (which will be further described in a later figure), by sending data relating to the thrust parameters that must be applied on the impact mass (namely to the head of the hammer, by a spring) in order to hit the zone or area out of tolerance detected with the force indicated by the computer 6.

Once the area or areas subject to deformation have been identified, hammer assembly 3 will position itself with its active part, namely the hammering head, close to that area, exerting one or more percussions depending on the degree of tolerance to be corrected. Hammer assembly 3 will be able to work the entire surface of the disk by virtue of the rotation of disk 5 on the axis of the spindle and by virtue of the displacement of hammer assembly 3 in the vertical direction made by a vertical carriage 7 and a transverse displacement made by a transverse carriage 8.

The computer 6, therefore, in a completely innovative and advantageous way, will provide to maintain both an archive of the processing carried out and will also use this archive for a subsequent self-regulation of the processing parameters based on the results previously obtained. In essence, the computer and regulator 6 can also perform functions of self-adaptive control, this in a completely innovative and advantageous way, also excluding in this phase of processing totally the presence of staff who could do the same job based only on their experience and with certainly greater times (and risks). This operation becomes therefore repeatable and industrially reproducible in a simple and effective way.

In FIG. 2 it is represented the detail of the sensor assembly 4 in which it is highlighted the sensor part or sensor 10 for example of capacitive type: by virtue of the movement of the carriage 11 composed of a moving part that slides in a guide, this sensor can move from the periphery of the disk 5 to the innermost part of the disk itself.

The moving part is driven, for example, by an electric motor. The sensor 10 can examine the whole surface of disk 5 thanks also to the rotation of said disk. Said capacitive sensor 10, will detect the discrepancies present on both faces of the disk, in fact the defects of planarity being detectable substantially indistinctly from one or the other face usually as said to a hump on one face corresponds a depression on the other face, at least for the most common defects.

In particular, by detecting planarity and/or out-of-tolerance defects, this referring to the plane identified by the disk clamping flange, which will be described below. As described above, these data are sent to the computer and regulator 6.

Note that, in one or more embodiment variants, at least two sensors can be present, one for measurement on each face of the disk, or the disk can be rotated for measurement on the other face, or the sensor can be rotated, this for greater accuracy.

FIG. 3 shows the part of spindle assembly 2 in which the head of the spindle 9 on which the disk will be mounted is highlighted for the processing phase on the innovative machine tool. The spindle will be equipped with a quick coupling in which to insert a shank for tightening the disk to be machined.

The shank (not visible here) can be fixed to the spindle, for example, by means of a ball coupling controlled by a pneumatic piston 25, able to hold the shank in its seat 10 in the spindle head 9. The head of the spindle 9 will rotate the disk 5 both for a first phase of planarity analysis, and for a second phase of actual processing, which will be carried out by means of the hammer that will correct the areas out of tolerance and/or excessively deformed. The figure shows the structural elements that support the spindle head and the motor for its drive. Obvious technical details are not specified and are merely construction details.

Figure 4:
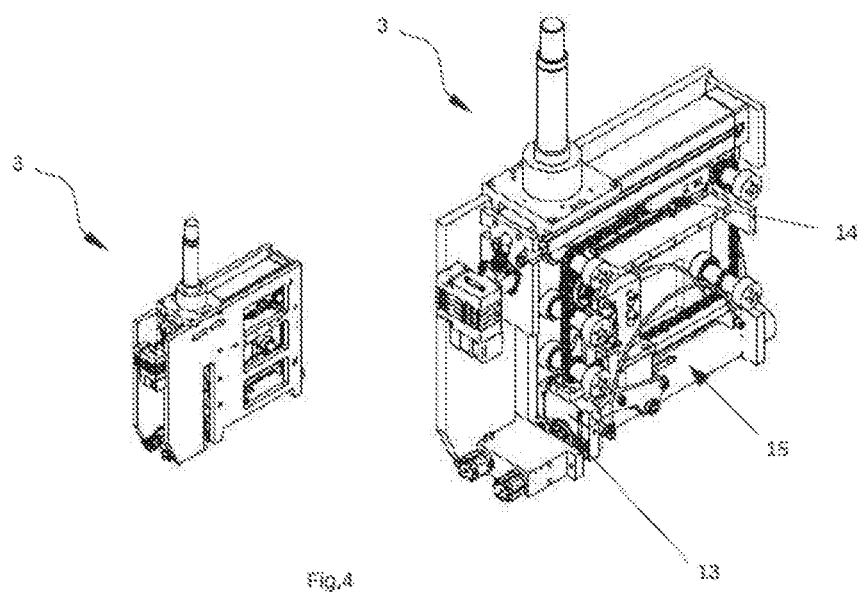
in FIG. 4 it is represented a preferred embodiment form of a detail of the hammer group.

FIG. 4 shows the detail of the hammer assembly 3 which is connected to the transversal carriage 8 and which includes as substantial elements at least a hammer 13 and a spring 15 with a preload piston 14 (not visible here). The preload piston, depending on the amount of force to be used to correct a certain degree of defect detected by sensor 10 on the surface of disk 5, will load the spring 15 which will then transfer the elastic energy at the time of the blow, to the beating head. As said, innovatively, the force with which to preload the spring, will be determined to time by time autonomously by the computer and regulator 6 that, based upon learning on the previously processed cases, will determine independently how to best dose this force in order to obtain the desired effect.

Figure 4A:
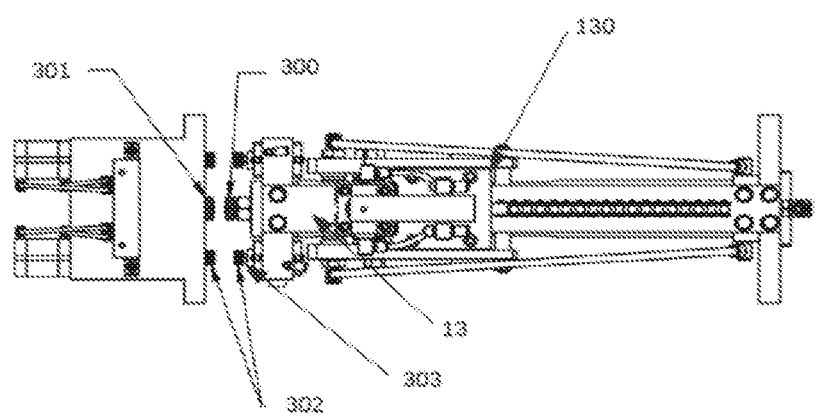

A detail of hammer assembly 3 is visible in FIG. 4*a* where in particular it is represented the hammer head 13 that comprises at least one beating bolt 300 and at least one additional anvil bolt 301 to act as a stop for the beating bolt. Among them is obviously placed the disk to be worked on. There are also pads 302, for example made of rubber, mounted on pneumatic cylinders 303 which avoid the resonance of the disk after the blow. To eliminate friction between the beating head 13 and its housing 130, compressed air is injected (by means of a solenoid valve or a suitable medium) in this housing to form an air cushion, thus avoiding the sliding of the head into the housing and the consequent wear and tear.

Figure 5A:
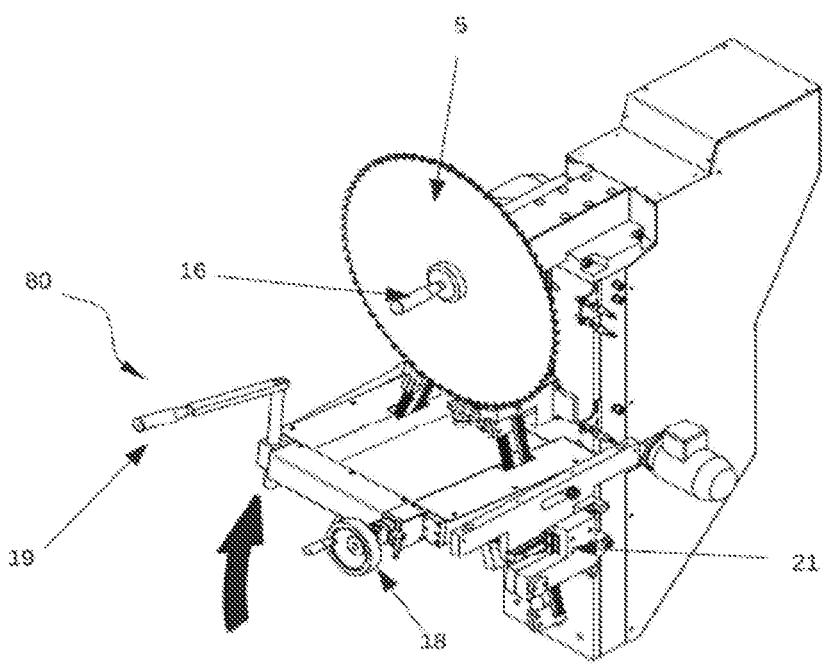
in FIG. 5 it is represented a preferred embodiment form of a particular of the disk loading/unloading group (which may or may not be present depending on the preferred embodiment forms).
Figure 5B:
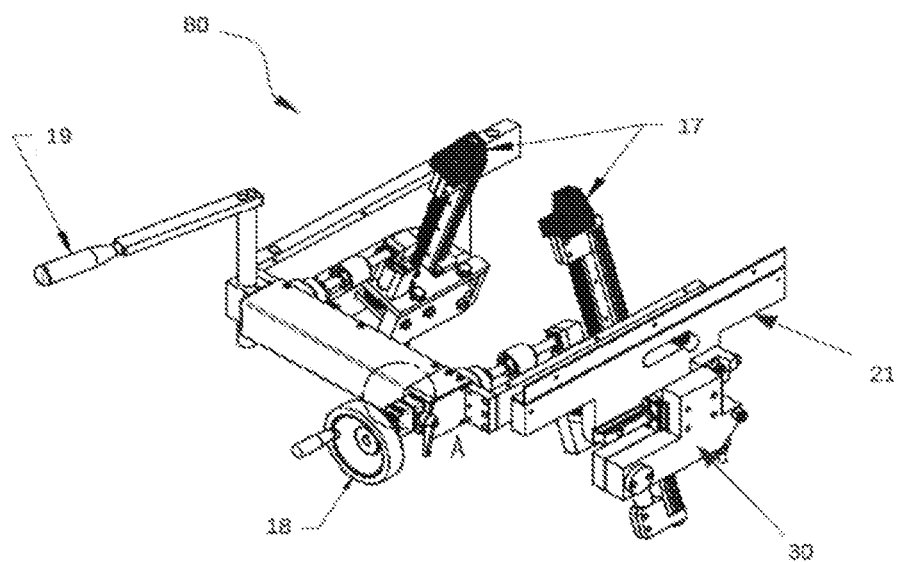

FIGS. 5*a* and 5*b* show a variant of a preferred form of design of a system 80 for loading and unloading the disk on/from the machine, in order to facilitate the positioning of large disks. This system can be optionally present on the machine tool object of the invention. With the increase of the diameter and consequent thickness of the blades, it becomes physically difficult and demanding the unloading but above all the loading of the blades.

With more detailed reference to FIG. 5b, where it is represented a disk 5 mounted on the machine, the machine comprising said loading/unloading system 80.

System 80 includes at least a support 21, a handgrip 19, a handwheel 18, to said structural support 21 are fixed solidly a plurality of blade supports 17 to support the disk to be mounted and there are also fixed solidly said handgrip and said handwheel, this to perform positioning and/or unloading in a semiautomatic way even for the heaviest disks.

To operate the system 80, proceed as follows: the handgrip 19 is grasped and the system 80 is dragged until the end of the stroke (towards the operator), a handwheel 18 is rotated to adjust the blade supports 17 in relation to the diameter of the blade/disk 5 that will be mounted (a numeric indicator is further included in which it is expressed in mm corresponding to the diameter of the blade to be loaded). By regulating the blade supports 17, by consequence, the central hole of the disk, once loaded on these supports, is in correspondence with the connection of the shank 16 on the spindle, this therefore advantageously avoids that such loading is carried out manually by an operator with the difficulties of keeping a heavy disk in balance when fixing it in the spindle.

The 80 system further includes a part of the frame 30 connected to the support 21, by means of a hinge that allows the rotation of the support 21 with respect to the frame 30 of a small angle, this rotation is made by exerting a force on the handgrip 19, favoring the insertion of the shank 16 in the spindle and then the fixing of the blade on the spindle, the blade is substantially pushed on the spindle, the supports accordingly are axially and radially distance from the teeth of the blade allowing it to rotate and release from the supports 17.

It is evident that the present invention allows to solve all the described problems of prior art allowing to obtain all the described advantages, noting that variants in materials used for the machine, materials in which the disks are made, size and weight of the same, variants in the type of sensors for measurements, in the mode of assembly parts, provided that they achieve the purposes of this invention, means of automation, type of carriages, etc. are all considered variants of the embodiment this invention and therefore fall within the scope of protection of this invention as better described by the annexed claims.

What is claimed is:

1. A machine device tool for processing a saw disk or a semi-finished tool saw disk, the machine device tool comprising:
    at least one processor;
    a spindle unit having at least one shank provided with a flange adapted to mount the saw disk or the semi-finished tool saw disk and to rotate said saw disk or said semi-finished tool saw disk for processing said saw disk or said semi-finished tool saw disk to planarity;
    at least one sensor assembly having at least one sensor, wherein the at least one sensor assembly is mounted on a carriage to slide the at least one sensor at least from the periphery of said saw disk or said semi-finished tool saw disk to the centre of said saw disk or the semi-finished tool saw disk, wherein said at least one sensor for detecting areas of discrepancy in planarity in at least each part of a disk face of said saw disk or said semi-finished tool saw disk and communicates said data to said at least one processor; and
    at least one hammer assembly connected to a transverse carriage assembly, the at least one hammer assembly having:
        at least one beating head, and
        at least one preloading spring with a preload piston coupled to the at least one beating head, wherein the preload piston is configured to load the at least one preloading spring to transfer elastic energy to the at least one beating head for giving, said at least one beating head, thrust for striking the areas of discrepancy in planarity in each part of the disk face detected by the at least one sensor,
    wherein said thrust for striking the areas of discrepancy in planarity in each part of the disk face is being determined by said at least one processor.

2. The machine device tool according to claim 1, wherein said carriage giving said at least one sensor a translatory movement in a radial direction of the saw disk or the semi-finished tool saw disk and the saw disk or the semi-finished tool saw disk rotating around a central axis thereof, allowing complete scanning of at least one side of the saw disk or the semi-finished tool saw disk.

3. The machine device tool according to claim 2, wherein the at least one sensor is configured to include two sensors, one on each side of the disk face, are configured to measure each part of both sides of the disk face while the disk is being rotated.

4. The machine device tool according to claim 1, wherein said at least one beating head comprises:
    at least one beating bolt, and
    at least one anvil bolt to act as a stop for the at least one beating bolt, wherein the saw disk or the semi-finished tool saw disk to be machined being placed between pads mounted on pneumatic cylinders.

5. The machine device tool according to claim 1, wherein said sensor is a capacitive sensor.

6. The machine device tool according to claim 1 further comprising a loading/unloading system, the loading/unloading system comprising:
    at least one support,
    a handgrip,
    a handwheel,
    a plurality of blade supports coupled to the at least one support to support the said saw disk or said semi-finished tool saw disk to be mounted on the at least one shank, and
    wherein said plurality of blade supports are also coupled to the handgrip and the handwheel to position, load, unload the said saw disk or said semi-finished tool saw disk on the spindle unit.

7. A method for processing saw disks using a machine device tool, the machine device tool having: at least one processor; a spindle unit having at least one shank provided with a flange adapted to mount the saw disk or the semi-finished tool saw disk and to rotate said saw disk or said semi-finished tool saw disk for processing said saw disk or said semi-finished tool saw disk to planarity; at least one sensor assembly having at least one sensor, wherein the at least one sensor assembly is mounted on a carriage to slide the at least one sensor at least from the periphery of said saw disk or said semi-finished tool saw disk to the centre of said saw disk or the semi-finished tool saw disk, wherein said at least one sensor detects for areas of discrepancy in planarity in at least each part of a disk face of said saw disk or said semi-finished tool saw disk and communicates said data to said at least one processor; and at least one hammer assembly connected to a transverse carriage assembly, the at least one hammer assembly having: at least one beating head, and at least one preloading spring with a preload piston coupled to the at least one beating head, wherein the preload piston is configured to load the at least one preloading spring to transfer elastic energy to the at least one beating head for giving, said at least one beating head, thrust for striking the areas of discrepancy in planarity in each part of the disk face detected by the at least one sensor, wherein said thrust for striking the areas of discrepancy in planarity in the at least each part of the disk face is being determined by said at least one processor, the method comprising:

retaining, via the at least one processor, data collected by said at least one sensor, wherein data collected by said at least one sensor comprises data relating to the detected areas of discrepancy in planarity in each part of the disk face of said saw disk or said semi-finished tool saw disk;

controlling, via the at least one processor, the thrust for striking the detected areas of discrepancy for obtaining planarity in at least each part of the disk face of said saw disk or said semi-finished tool saw disk;

detecting for, via the at least one processor, planarity in at least each part of the disk face of said saw or said semi-finished tool saw disk by means of said at least one sensor, obtained after striking the areas of discrepancy;

storing, in a database, data related to the thrust for striking the area of discrepancy for obtaining planarity of at least each part of the disk face of said saw disk or said semi-finished tool saw for processing, via the processor, a subsequent work piece;

wherein said at least one processor is adapted to perform self-learning.

8. The method according to claim 7, further comprising:

collecting, via the at least one sensor, data related to the detected areas of discrepancy in planarity in at least each part of the disk face of said saw disk or said semi-finished tool saw disk;

processing the data collected by the at least one sensor;

in case of discrepancy:

processing, by the at least one processor, the areas of discrepancy in planarity in at least each part of the disk face of said saw disk or said semi-finished tool saw disk;

producing, by the at least one beating head, the thrust for striking the areas of discrepancy;

verifying, by the at least one sensor, a result of planarity in at least each part of the disk face of said saw disk or said semi-finished tool saw disk, after striking the areas of discrepancy by the at least one beating head;

if the result of planarity in at least each part of the disk face of said saw disk or said semi-finished tool saw disk falls within a tolerance range, end processing of at least each part of the disk face of said saw disk or said semi-finished tool saw disk;

if the result of planarity in at least each part of the disk face of said saw disk or said semi-finished tool saw disk is outside the tolerance range;

repeating the step of producing, by the at least one beating head, the thrust for striking the areas of discrepancy until a desired result related to the areas of discrepancy is obtained.

* * * * *